United States Patent [19]

Kuhn et al.

[11] Patent Number: 4,515,835

[45] Date of Patent: May 7, 1985

[54] HIGH SOLIDS THERMOSETTING COATING COMPOSITIONS, CURED COATINGS, COATED ARTICLES, AND PROCESSES

[75] Inventors: Robert R. Kuhn, Lansdale; John D. Whiteman, Churchville; William H. Brendley, Jr., Hatboro, all of Pa.

[73] Assignee: Rohm and Haas Company, Philadelphia, Pa.

[21] Appl. No.: 452,546

[22] Filed: Dec. 23, 1982

[51] Int. Cl.$^3$ .......................... B05D 7/16; C08L 61/28
[52] U.S. Cl. .................................. 427/388.3; 428/460; 428/461; 428/463; 525/162; 525/185; 525/328.8; 525/384
[58] Field of Search ...................... 525/162, 384, 328.8, 525/185; 427/388.3; 428/460, 463

[56]  References Cited

U.S. PATENT DOCUMENTS

| | | | |
|---|---|---|---|
| 3,267,174 | 8/1966 | Fry et al. | 525/164 |
| 3,352,806 | 11/1967 | Hicks | 524/428 |
| 4,022,726 | 5/1977 | Zabrocki et al. | 260/21 |
| 4,052,480 | 10/1977 | Sekmakas | 525/162 |
| 4,144,395 | 3/1979 | Murphy et al. | 560/200 |
| 4,276,212 | 6/1981 | Khanna et al. | 525/162 |
| 4,314,918 | 2/1982 | Birkmeyer et al. | 525/162 |
| 4,343,925 | 8/1982 | Chang et al. | 525/440 |

OTHER PUBLICATIONS

Proceedings of the Ninth Water–Borne & Higher Solids Coatings Symposium, 02/17-19/82; Price et al., pp. 231-251.

Sharma, M., A Critical Evaluation of High Solids Coating, 03/1982, pp. 17-18.

*Primary Examiner*—Theodore E. Pertilla
*Attorney, Agent, or Firm*—Michael B. Fein

[57] ABSTRACT

Disclosed herein are high solids thermosetting compositions comprising a solution of a soft, low molecular weight, hydroxy-functional addition polymer resin and a low molecular weight reactive diluent having two or three aliphatic hydroxyl groups per molecule, the weight ratio of resin to diluent being greater than 1, said coating composition when combined with melamine crosslinking agent being of sprayable, roller coatable, or dip coatable viscosity. Cured coatings, coated articles and processes of coating an article are also disclosed.

33 Claims, No Drawings

HIGH SOLIDS THERMOSETTING COATING COMPOSITIONS, CURED COATINGS, COATED ARTICLES, AND PROCESSES

BACKGROUND OF THE INVENTION

1. Field of the Invention

This invention relates to the field of high solids thermosetting coating compositions.

2. Description of the Prior Art

Sekmakas, U.S. Pat. No. 4,144,220, teaches essentially solvent-free resinous coating compositions which thermoset to provide chemically resistant coating compositions and are made by copolymerizing monoethylenically unsaturated monomers including monomers having a functional group selected from carboxylic acid, hydroxy and amide groups in a solvent medium consisting essentially of liquid water insoluble trihydric alcohol having a molecular weight of at least 500, and then adding an aminoplast resin. The ratio of reactive copolymers to trihydric alcohol is from 0.15 to 0.80 in the Sekmakas patent. Sekmakas does not teach soft, low molecular weight acrylic copolymers having a combination of acid and hydroxy functionality.

Fry et al, U.S. Pat. No. 3,267,174 teach high solids acrylic coating compositions prepared by thermoset crosslinking acrylic acid copolymer, polyalkylene polyol and a formaldehyde-derived resin. The acrylic acid copolymer must have a glass transition temperature, $T_g$, of at least 25° C.

The high solids formulations which Fry et al teach are very viscous solutions which would not be suitable for spray, dip, or roller coating applications. Furthermore, Fry et al do not teach acrylic acid copolymers which also contain hydroxy functionality.

Smith U.S. Pat. No. 4,256,522 discloses a four component composition comprising a non-aminoplast hydroxyl bearing polymer, (poly)glycol monoether, an aminoplast or phenolic resin capable of curing the hydroxyl bearing polymer, and a strong acid catalyst for the reaction between the first and third components. The (poly)glycol monoether is a monohydroxy material and, as such, is incapable of crosslinking and, in fact, the teachings of the patent imply that the monoether does not enter into the reaction.

Smith U.S. Pat. No. 4,351,928 is similar to the aforementioned Smith patent except rather than the monoether, a liquid amino- or hydroxy aromatic diluent is used. In this diluent the hydroxy group(s) are attached to the aromatic ring.

Chang et al U.S. Pat. No. 4,343,025 teaches liquid coating compositions consisting essentially of a curable film-forming polyol-containing component and an organic reactive diluent which contains one primary or secondary hydroxyl group. The coating compositions can be formulated to contain little or no volatile organic solvent and/or water.

The reactive diluent approach to meeting air quality environmental requirements has been suggested by others. "Proceedings of the ninth Water-Borne and Higher Solids Coatings Symposium, Feb. 17-19, 1982," pages 231-251, is exemplary of the state of the art. In this paper the authors found little benefit to the reactive diluent approach to increasing the nonvolatiles in high solids coatings.

In another paper exemplary state of the art, *High Solids Coatings*, March 1982, pages 17-18 entitled "A Critical Evaluation of High solids Coatings," Sharma, also discusses disadvantages in high solids coatings—the discrepancy between theoretical and actual volume solids.

SUMMARY OF THE INVENTION

It is an object of the present invention to provide high solids, addition polymer resin based, reactive diluent containing, thermosetting coating compositions which have an excellent balance of properties.

It is a further object to provide some coating compositions which meet the Clean Air Act volatile organic compound (VOC) target levels.

It is another object to provide such compositions which are of sprayable viscosity at ambient temperature.

A still further object is to provide coatings which have excellent pigment dispersion, durability, hardness, and high gloss properties.

A still further object is to provide high solids coatings which have measured volume solids which do not vary significantly from theoretical.

These objects and others as will become apparent from the following disclosure, are achieved by the following invention which comprises soft, low molecular weight, hydroxy-functional addition polymer resin, and low molecular weight reactive diluent having two or three aliphatic hydroxyl groups per molecule, the weight ratio of resin to diluent being greater than 1, said composition when combined with aminoplast crosslinking agent being of sprayable, roller coatable, or dip coatable viscosity.

In another aspect, the invention comprises coatings cured from such compositions and articles coated with such compositions and processes of coating an article comprising applying such composition on an article and curing.

DETAILED DESCRIPTION OF THE INVENTION AND THE PREFERRED EMBODIMENTS

The high solids coating compositions of the invention are mixtures of resin and diluent components, plus optional additional components such as inert solvent, pigments, catalysts, and other additives.

The first component is a soft, low molecular weight hydroxy functional addition polymer resin. Preferably the addition polymer resin has a GPC $\overline{M}_w$ of less than about 20,000 and more preferably has a $\overline{M}_w$ of less than about 10,000 with a dispersity defined by the formula $\overline{M}_w/\overline{M}_n$ of less than about 8.

By soft is meant a $T_g$ of below about 25° C. Preferably the $T_g$ is below about 15° C.

It is highly preferred and very advantageous if the resin component contains both acid and hydroxyl functionality. Hydroxyl functionality, and the preferred acid functionality, are introduced into the copolymer chain by use of hydroxyl functional and optional acid functional monoethylenically unsaturated monomers. The preferred monomers for introducing these functionalities are hydroxyethyl acrylate, hydroxypropyl acrylate, hydroxyethyl methacrylate, hydroxypropyl methacrylate, acrylic acid and methacrylic acid. Other such monomers can also be used, as well as mixtures thereof.

Preferably the addition polymer resin component has a hydroxyl functionality of at least 1.5 and below about 6 per polymer chain, and more preferably about 2 to 4 per polymer chain, and an acid functionality when present of about 0.1 to 2 per polymer chain, more preferably about 0.4 to 1 per polymer chain.

The other monoethylenically unsaturated monomers used to prepare the resin are governed by the low $T_g$ requirement. Suitable monomers include acrylates, methacrylates and non-acrylic monomer(s). Preferred acrylic monomers are selected from methyl acrylate, ethyl acrylate, n-butyl acrylate, isobutyl acrylate, 2-ethylhexyl acrylate, methyl methacrylate, ethyl methacrylate, n-butyl methacrylate, and isobutyl methacrylate. Other, less preferred, acrylic monomers are acrylonitrile, acrylamide, methacrylonitrile, and methacrylamide. Preferably no more than about 75%, and more preferably no more than about 60% of the units of the resin can be from non-acrylic monomers such as styrene, alpha-methyl styrene, para-methyl styrene, vinyl acetate, vinyl toluene, and vinyl chloride.

The resins are typically prepared using a chain transfer agent and a polymerization initiator. Preferred chain transfer agents are the mercaptans, especially ethyl mercaptan, normal propyl mercaptan, normal butyl mercaptan, iso-butyl mercaptan, tertiary butyl mercaptan, normal amyl mercaptan, iso-amyl mercaptan, tertiary amyl mercaptan, normal hexyl mercaptan, cyclohexyl mercaptan, normal octyl mercaptan, tertiary octyl mercaptan, normal dodecyl mercaptan, tertiary dodecyl mercaptan, 2-hydroxyethyl mercaptan, 3-mercapto proprionic acid, and methyl 3-mercaptoproprionate.

Conventional polymerization initiators are suitable. Especially preferred are those selected from tertiary butyl peracetate, tertiary butyl perbenzoate, tertiary butyl peroctoate, tertiary butyl peroxypivalate, tertiary butyl hydroxperoxide, benzoyl peroxide, cumene hydroperoxide, and 2-tert-butylazo-2-cyanobutane.

The low molecular weight reactive diluent has two or three aliphatic hydroxyl groups per molecule and preferably has a molecular weight of about 250 to 1000, more preferably 300 to 750, and most preferably 400 to 600. The reactive diluent(s) in the composition of the invention must remain nonvolatile under curing conditions to minimize emissions. Preferably the diluent is essentially nonvolatile at 300° F. The reactive diluent may be water soluble or water insoluble.

Suitable reactive diluents are diols and triols having two or three aliphatic hydroxyl groups per molecule, for example, trimethylolpropane polypropylene ether triol, trimethylolpropane polyethylene ether triol, trimethylolpropane polyethylene/propylene ether triol, and trimethylolpropane polybutylene ether triol; polyethylene ether glycol, polypropylene ether glycol, polyethylene/propylene ether glycol, polytetramethylene ether glycol, bisphenol A polyethylene ether diol, bisphenol A polypropylene ether diol; and bisphenol A polypropylene/ethylene ether diol, and the like, and mixtures thereof.

The coating compositions of the invention are used with an aminoplast crosslinking agent. The aminoplasts can be alkylated melamine-formaldehyde or ureaformaldehyde resins. The crosslinking agent can be polymeric, but is preferably monomeric. Suitable aminoplasts are highly alkylated hexamethoxymethyl melamine, methoxy/ethoxymethyl melamine, methoxy/butoxymethyl melamine, methoxy/isobutoxymethyl melamine, ethoxymethyl melamine, butoxymethyl melamine; partially alkylated methoxymethyl melamine, methoxy/ethoxymethyl melamine, methoxy/butoxymethyl melamine, methoxy/isobutoxymethyl melamine, ethoxymethyl melamine, butoxymethyl melamine; highly alkylated or partially alkylated methoxymethyl urea, methoxy/ethoxymethyl urea, methoxy/butoxymethyl urea, methoxy/isobutoxymethyl urea, ethoxymethyl urea, butoxymethyl urea, and mixtures thereof.

In addition to the resin, diluent, and aminoplast components, the formulation should also include solvent and optional additives such as catalyst, pigment, flow and leveling aids, thixotropes, mar and slip agents, etc.

The compositions should be formulated with an amount of solvent and optionally pigment, catalyst, and other additives so as to bring the formulated composition solids level to about 65 to 95 weight percent, preferably to about 70 to 80 weight percent.

Suitable catalysts include methanesulfonic acid, para toluenesulfonic acid, nonylbenzenesulfonic acid, dodecylbenzenesulfonic acid, dinonylnapthalenedisulfonic acid, trifluoroacetic acid, phosphoric acid, polyphosphoric acid, mono-di-n-butyl acid orthophosphate and amine salts thereof. Suitable amounts of catalyst are about 0.1 to 2 percent, based on solids.

The solvent can be selected from ketones such as methyl ethyl ketone, methyl propyl ketone, methyl isobutyl ketone, methyl n-butyl ketone methyl isoamyl ketone, methyl n-amyl ketone, methyl heptyl ketone, ethyl butyl ketone, ethyl amyl ketone, diisobutyl ketone, and cyclohexanone; esters such as ethyl acetate, isopropyl acetate, n-propyl acetate, secondary butyl acetate, isobutyl acetate, n-butyl acetate, amyl acetate, methyl amyl acetate, isobutyl isobutyrate, methyloxyethyl acetate, ethyloxyethyl acetate, butyloxyethyl acetate, and 2-ethyl hexyl acetate; alcohols such as isopropyl alcohol, n-propyl alcohol, secondary butyl alcohol, isobutyl alcohol, n-butyl alcohol, amyl alcohol, methyl isobutyl carbinol, and cyclohexanol; and other solvents such as toluene, xylene, aromatic naphtha, diacetone alcohol, and mesityl oxide and mixtures thereof.

The compositions are preferably of sprayable viscosity, but can also be of roller coatable or dipable viscosity. In pigmented formulations, these viscosities, measured on a #4 Ford cup at 25° C., are typically below about 200 seconds, preferably below about 120 seconds, and most preferably about 35 to 90 seconds. These compositions are quite distinguishable from higher viscosity, e.g. extrudable viscosity, systems.

The composition is preferably applied by conventional spraying means which can include spraying by air, airless, or electrostatic methods. The compositions may also be applied by methods other than spraying such as by roller coating, dip coating, etc., but spraying is the most preferred method contemplated.

The compositions display, even at the high solids levels, an advantageous balance of low VOC, sprayability, sag resistance, flow, and leveling properties. The composition when sprayed onto an article and cured has a very advantageous balance of film properties, including the properties of hardness, flexibility, impact resistance, solvent resistance, stain resistance, chemical resistance, and gloss.

EXAMPLES

The following examples are presented to illustrate a few embodiments of the invention, but are not intended to be limiting. All parts and percentages are by weight, and the following abbreviations are used.

ABBREVIATIONS USED IN TABLES I AND II

MA = Methyl Acrylate
EA = Ethyl Acrylate
BA = Butyl Acrylate
IBA = Isobutyl Acrylate
EHA = 2-Ethylhexyl Acrylate
MMA = Methyl Methacrylate
EMA = Ethyl Methacrylate
BMA = Butyl Methacrylate
IBMA = Isobutyl Methacrylate
STY = Styrene
HEA = Hydroxyethyl Acrylate
HPA = Hydroxypropyl Acrylate
HEMA = Hydroxyethyl Methacrylate
HPMA = Hydroxypropyl Methacrylate
AA = Acrylic Acid
MAA = Methacrylic Acid
CTA = Chain Transfer Agent
RD = Reactive Diluent
TMP = Trimethylolpropane polypropylene ether triol, molecular weight of about 425
TPP = trimethylolpropane polypropylene ether triol, molecular weight of about 730
PEG = polyethylene ether glycol, molecular weight of about 300
BAP = bisphenol A polyethylene ether diol, molecular weight of about 400
OPE = octylphenoxyethoxy ethanol (one hydroxyl group per molecule)
MF = partially methylated melamine-formaldehyde resin
HMMM = hexamethoxymethyl melamine
PPA = polyphosphoric acid
DDS = dinonylnaphthalenedisulfonic acid
PTSA = para toluenesulfonic acid
G = Good
E = Excellent
F = Fair
P = Poor

* = Comparative

EXAMPLES 1-28

Preparation of soft, low molecular weight addition polymer resin and low molecular weight reactive diluent solutions Solutions in accordance with the invention are prepared by charging the following constituents into a three liter resin kettle equipped with a mechanical stirrer, reflux condenser, thermometer, nitrogen inlet, two addition funnels and a hot oil bath.

| Constituents | Parts by Weight |
|---|---|
| Portion 1 | |
| Methyl n-amyl ketone (solvent) | 14.3 |
| Portion 2 | |
| Monomers in Accordance with Table I | 100.0 |
| CTA in accordance with Table I | 1.5-4.0 |
| Portion 3 | |
| Methyl n-amyl ketone (solvent) | 10.0 |
| 98% t-Butyl Perbenzoate (initiator) | 0.76 |
| Portion 4 | |
| RD parts in accordance with Table I | 22.5-95.0 |

Portion 1 is charged into the resin kettle and heated to its reflux temperature of 150° C. The constituents are constantly stirred in the resin kettle during the entire process. Portion 2 is premixed and added gradually over 180 minute period while the resulting reaction mixture is held at its reflux temperature. Portion 3 is premixed and a part (67%) is added simultaneously with Portion 2 over a 210 minute period. At the end of the first part of the initiator feed, the reaction mixture is held at 150° C. for 30 minutes. Then the remaining part of Portion 3 is added over a 30 minute period. The reaction mixture is held at 150° C. for an additional 30 minutes. At the end of the 30 minutes the reaction mixture is cooled to 140° C. Portion 4 is added over a 30 minute period. The resulting solution is stirred an additional 30 minutes while cooling to 90° C. and then filtered.

TABLE I

| Ex. | MA | EA | BA | IBA | EHA | MMA | EMA | BMA | IBMA | STY | HEA |
|---|---|---|---|---|---|---|---|---|---|---|---|
| 1 | 22.5 | 65.5 | | | | | | | | | 9.7 |
| 2 | 45.6 | | | | 10.0 | | | | | 27.4 | 16.0 |
| 3 | | 33.5 | | | | | | 46.0 | | | |
| 4 | | 47.0 | 25.2 | | | 8.0 | | | | | |
| 5 | | 42.0 | | 20.0 | | | | | | 22.5 | |
| 6 | | | 32.0 | | | 40.0 | | | 10.5 | | |
| 7 | | | 47.6 | | | 37.0 | | | | | 13.4 |
| 8 | | | 44.5 | | | 18.0 | | | | 18.0 | |
| 9 | | | 42.2 | | | | | | | 42.0 | |
| 10 | | | 20.8 | | 19.2 | | | | | 43.0 | |
| 11 | | | | 40.0 | 24.0 | 10.0 | | | | | 15.5 |
| 12 | | 30.0 | | 32.0 | | | 21.7 | | | | |
| 13 | | 27.0 | | 37.0 | | | | 19.7 | | | |
| 14 | | 20.4 | | 30.8 | | | | | 27.8 | | |
| 15 | | | 19.5 | | 10.0 | | | 16.5 | | 32.0 | |
| 16 | | | 30.0 | | | | | | | 52.0 | |
| 17 | | | 30.0 | | | 12.5 | | | 18.0 | 23.5 | 13.7 |
| 18 | | | | 60.0 | | | 25.0 | | | | 12.5 |
| 19 | | | | 49.2 | | | | 30.0 | | | |
| 20 | | | | 38.5 | | | | | 22.0 | 21.5 | |
| 21 | | 42.0 | | | 12.8 | | 30.2 | | | | 13.0 |
| 22 | | 50.5 | | | | | 34.5 | | | | |
| 23 | | | 48.6 | | | | | | | 34.4 | |
| 24 | | | 43.6 | | | 11.3 | | | | 29.4 | |
| 25 | | | 33.2 | | | | | | | 52.0 | |
| 26 | | | 28.0 | | | | | | 22.5 | 36.0 | |
| 27 | | | | | 38.2 | | | 45.8 | | | |
| 28 | | | 41.9 | | | 10.9 | | | | 28.0 | |

TABLE I-continued

| Ex. | HPA | HEMA | HPMA | AA | MAA | CTA | RD |
|---|---|---|---|---|---|---|---|
| 1 | | | | 2.3 | | 2.5 | 22.5 |
| 2 | | | | 1.0 | | 3.0 | 41.7 |
| 3 | | 17.5 | | | 3.0 | 3.2 | 37.8 |
| 4 | | | 17.6 | | 2.2 | 4.0 | 46.2 |
| 5 | 14.0 | | | 1.5 | | 3.0 | 95.0 |
| 6 | | 15.0 | | | 2.5 | 4.0 | 81.9 |
| 7 | | | | 2.0 | | 1.5 | 90.0 |
| 8 | 17.0 | | | 2.5 | | 3.5 | 30.0 |
| 9 | | 13.8 | | 2.0 | | 4.0 | 41.7 |
| 10 | | 14.2 | | | 2.8 | 2.5 | 30.0 |
| 11 | | | | 1.5 | | 3.0 | 49.1 |
| 12 | | | 14.0 | 2.3 | | 3.5 | 77.6 |
| 13 | | | 14.0 | | 2.3 | 3.5 | 66.7 |
| 14 | 18.5 | | | 2.5 | | 4.0 | 56.7 |
| 15 | | 20.0 | | | 2.0 | 3.0 | 48.2 |
| 16 | | 15.0 | | 3.0 | | 4.0 | 41.7 |
| 17 | | | | 2.3 | | 3.5 | 32.3 |
| 18 | | | | | 2.5 | 3.0 | 37.8 |
| 19 | | 17.8 | | | 3.0 | 2.5 | 37.8 |
| 20 | 16.5 | | | 1.5 | | 4.0 | 22.5 |
| 21 | | | | 2.0 | | 2.5 | 77.6 |
| 22 | 12.6 | | | | 2.4 | 3.0 | 66.7 |
| 23 | | 14.8 | | 2.2 | | 4.0 | 50.9 |
| 24 | | | 13.5 | 2.2 | | 4.0 | 40.0 |
| 25 | | 13.8 | | 1.0 | | 4.0 | 41.7 |
| 26 | | 11.5 | | 2.0 | | 3.5 | 81.1 |
| 27 | | | 15.0 | | 1.0 | 1.0 | 69.0 |
| 28 | | | 13.0 | 2.1 | | 3.5 | 67.0 |

EXAMPLES 29 TO 41

Coating Compositions and Coated Articles

Coating compositions were prepared by dissolving addition polymer resin made in accordance with Examples 1–28 and reactive diluent (RD) in solvent according to the general description of Examples 1–28.

Aminoplast, optional catalyst, pigment, flow and leveling aids, and additional solvent where necessary, are combined with the resin-RD solution by milling or sand grinding. Solids, component ratios, viscosities, densities, and VOC properties are measured and reported in Table II.

The resultant coating compositions were sprayed on Bonderite 1000 substrate, air dried 15–20 minutes, then baked in accordance with the schedule in Table III. The resultant sag resistance, dry film thickness, Tukon hardness (KHN), pencil hardness, knife adhesion, flexibility, gloss, and reverse impact resistance are reported in Table III.

Comparative examples as indicated by the asterisk (*) with monohydroxy reactive diluent or without reactive diluent were run and the results are also reported in Tables II and III.

TABLE II

Coating Composition Formulations and Properties

| | Examples | | | | | | | | | | | | |
|---|---|---|---|---|---|---|---|---|---|---|---|---|---|
| | 29 | 30 | 31 | 32 | 33 | 34* | 35* | 36 | 37* | 38 | 39* | 40 | 41* |
| Resin of Ex. # | 16 | 16 | 16 | 16 | 16 | 16 | 16 | 16 | 16 | 25 | 25 | 9 | 16 |
| RD | TMP | TMP | TPP | BAP | PEG | OPE | none | TMP | none | TMP | none | TMP | none |
| Aminoplast | MF | MF | MF | MF | MF | MF | MF | HMMM | HMMM | HMMM | HMMM | HMMM | HMMM |
| Catalyst, % active based on resin solids | none | 0.75 PPA | none | none | none | none | none | 0.55 DDS | 0.55 DDS | 0.72 PTSA | 0.72 PTSA | 0.5 PTSA | 0.5 PTSA |
| TiO$_2$ pigment/binder | 45/55 | 45/55 | 45/55 | 45/55 | 45/55 | 45/55 | 45/55 | 45/55 | 45/55 | 45/55 | 45/55 | 45/55 | 45/55 |
| Resin/ | 5 | 5 | 5 | 5 | 5 | 5 | 3 | 5 | 3 | 5 | 3 | 5 | 3 |
| RD/ | 2 | 2 | 2 | 2 | 2 | 2 | 0 | 2 | 0 | 2 | 0 | 2 | 0 |
| Melamine | 3 | 3 | 3 | 3 | 3 | 3 | 1 | 3 | 1 | 3 | 1 | 3 | 1 |
| Solids, wt. % calc. | 75.5 | 70.9 | 75.5 | 73.0 | 77.0 | 76.2 | 68.0 | 73.6 | 69.1 | 75.9 | 69.9 | 77.0 | 68.0 |
| Solids, wt. %, meas., 230° F., 60 min. | 73.6 | 67.9 | 73.9 | 72.8 | 74.4 | 74.2 | 65.4 | 72.6 | 67.8 | 74.4 | 69.6 | 75.5 | 67.7 |
| Viscosity 25° C., sec., #4 Ford cup | 90 | 45 | 90 | 77 | 99 | 91 | 42 | 46 | 35 | 35 | 31 | 39 | 37 |
| Density, lbs./gal. | 11.19 | 10.65 | 11.18 | 10.85 | 11.44 | 11.24 | 10.56 | 10.80 | 10.53 | 11.12 | 10.72 | 11.25 | 10.68 |
| VOC, lbs/gal, calc. | 2.74 | 3.10 | 2.74 | 2.93 | 2.63 | 2.68 | 3.38 | 2.58 | 3.25 | 2.68 | 3.23 | 2.59 | 3.42 |
| VOC, lbs/gal, 230° F., 60 min. measd. | 2.95 | 3.42 | 2.92 | 2.95 | 2.93 | 2.90 | 3.65 | 2.96 | 3.39 | 2.85 | 3.26 | 2.76 | 3.45 |

TABLE III

| | Film Properties Examples | | | | | | | | | | | |
|---|---|---|---|---|---|---|---|---|---|---|---|---|
| | 29 | 30 | 31 | 32 | 33 | 34* | 35* | 36 | 37* | 38 | 39* | 40 | 41* |
| Baking temp. (°F.) | 300 | 250 | 300 | 300 | 300 | 300 | 300 | 300 | 300 | 300 | 300 | 300 | 300 |
| Baking time, min. | 30 | 30 | 30 | 30 | 30 | 30 | 30 | 30 | 30 | 20 | 20 | 20 | 20 |
| Sag Resistance | F-G | G | F-G | F-G | F-G | G | G | G | G | F-G | G | F-G | G |
| Film Thickness, mils | 1.1 | 1.1 | 1.1 | 1.1 | 1.1 | 1.1 | 1.1 | 1.1 | 1.1 | 1.2 | 1.2 | 1.1 | 1.1 |
| Tukon hardness, KHN | 18.3 | 14.7 | 12.7 | 23.1 | 16.1 | 17.3 | 22.3 | 18.6 | 22.2 | 19.2 | 17.8 | 15.3 | 14.1 |
| Pencil hardness | 2H | H | H | 2H | H | H | 4H | 3H | 4H | 4H | 4H | 2H-3H | 2H |
| Knife Adhesion | G | F | F-G | G | F | F-G | G | F-G | F | F | F-G | F-G | F-G |
| Flexibility | G | G-E | G | F-G | G | F-G | P | G | G | F-G | F-G | G | F-G |
| Gloss, 20° | 80 | 89 | 81 | 85 | 79 | 78 | 89 | 79 | 87 | 86 | 91 | 83 | 82 |
| Gloss, 60° | 95 | 99 | 95 | 98 | 95 | 95 | 95 | 96 | 100 | 98 | 100 | 95 | 94 |
| Reverse impact | pass | pass | pass | pass | pass | fail | fail | pass | pass | pass | fail | pass | pass |

We claim:

1. High solids, thermosetting coating composition comprising a soft, low molecular weight, hydroxy-functional addition polymer resin having a GPC $\overline{M}_w$ of less than about 20,000, having a glass transition temperature (Tg) of below about 25° C., a low molecular weight polyether reactive diluent having (a) two or three aliphatic hydroxyl groups per molecule, (b) the property of remaining essentially nonvolatile under curing conditions to minimize emissions, and (c) a molecular weight of about 250 to 1000, the weight ratio of resin to diluent being greater than 1, and an inert organic solvent for said resin and said diluent, said coating composition, when combined with aminoplast crosslinking agent, being of sprayable, roller coatable, or dip coatable viscosity.

2. Composition in accordance with claim 1 wherein the resin has both acid and hydroxyl functionality.

3. Composition in accordance with claim 1 wherein reactive diluent has a molecular weight of about 300 to 750.

4. Composition in accordance with claim 1 wherein reactive diluent has a molecular weight of about 400 to 600.

5. Composition in accordance with claim 1 wherein the resin has a GPC $\overline{M}_w$ less than about 10,000 and a dispersity defined by the formula $\overline{M}_w/\overline{M}_n$ of less than about 8.

6. Composition in accordance with claim 1 wherein the resin has a $T_g$ below about 15° C.

7. Composition in accordance with claim 1 wherein the resin has a hydroxyl functionality below about 6 per polymer chain.

8. Composition in accordance with claim 1 wherein the resin has a hydroxyl functionality below about 4 per polymer chain.

9. Composition in accordance with claim 1 further including pigment.

10. Composition in accordance with claim 1 wherein said composition is unpigmented.

11. Composition in accordance with claim 1 wherein the weight ratio of resin to reactive diluent is about 1.1 to about 4.5.

12. Composition in accordance with claim 1 wherein reactive diluent has a viscosity of less than about 8000 cP at 25° C.

13. Composition in accordance with claim 1 wherein reactive diluent has a viscosity of less than about 1000 cP at 25° C.

14. Composition in accordance with claim 1 wherein reactive diluent is a trimethylolpropane polypropylene ether triol.

15. Composition in accordance with claim 1 further including aminoplast crosslinking agent.

16. Composition in accordance with claim 15 wherein the ratio of resin to an aminoplast crosslinking agent is about 0.85 to about 3.

17. Composition in accordance with claim 15 wherein the aminoplast is a monomeric melamine.

18. Composition in accordance with claim 17 wherein the monomeric melamine is hexamethoxymethyl melamine.

19. Composition in accordance with claim 15 wherein the aminoplast is a polymeric melamine.

20. Composition in accordance with claim 15 further including a catalyst.

21. Composition in accordance with claim 15 wherein the composition has a solids level, including pigment, catalyst, and other additives, of about 65 to 95 weight percent, the balance being inert solvent.

22. Composition in accordance with claim 21 wherein the solids level is about 68 to 85 weight percent.

23. Composition in accordance with claim 21 wherein the solids level is about 70 to 80 weight percent.

24. Process of coating an article comprising applying the composition of claim 15 on said article and curing.

25. A coating cured from the composition of claim 15.

26. A coated article coated with the composition of claim 15.

27. Composition in accordance with claim 15 wherein the #4 Ford cup viscosity at 25° C. is below about 200 seconds and the composition is sprayable.

28. Composition in accordance with claim 15 wherein the #4 Ford cup viscosity at 25° C. is below about 120 seconds.

29. Composition in accordance with claim 15 wherein the #4 Ford cup viscosity is about 35–90 seconds.

30. Composition in accordance with claim 1 wherein said reactive diluent is non-nitrogen containing.

31. Composition in accordance with claim 1 wherein said resin is non-amide containing.

32. Composition in accordance with claim 1 wherein said diluent is a polyether selected from the group consisting of trimethylolpropane polypropylene ether triol, trimethylolpropane polyethylene ether triol, trimethylolpropane polyethylene/propylene ether triol, trimethylolpropane polybutylene ether triol; polyethylene ether glycol, polypropylene ether glycol, polyethylene/propylene ether glycol, polytetramethylene ether glycol, bisphenol A polyethylene ether diol, bisphenol A polypropylene ether diol, and bisphenol A polypropylene/ethylene ether diol.

33. Composition in accordance with claim 1 wherein said diluent is essentially nonvolatile at 300° F.

* * * * *